Oct. 30, 1934.   F. C. MACDONALD ET AL   1,978,680
HYDRAULIC TRANSMISSION
Filed Dec. 18, 1931   3 Sheets-Sheet 1
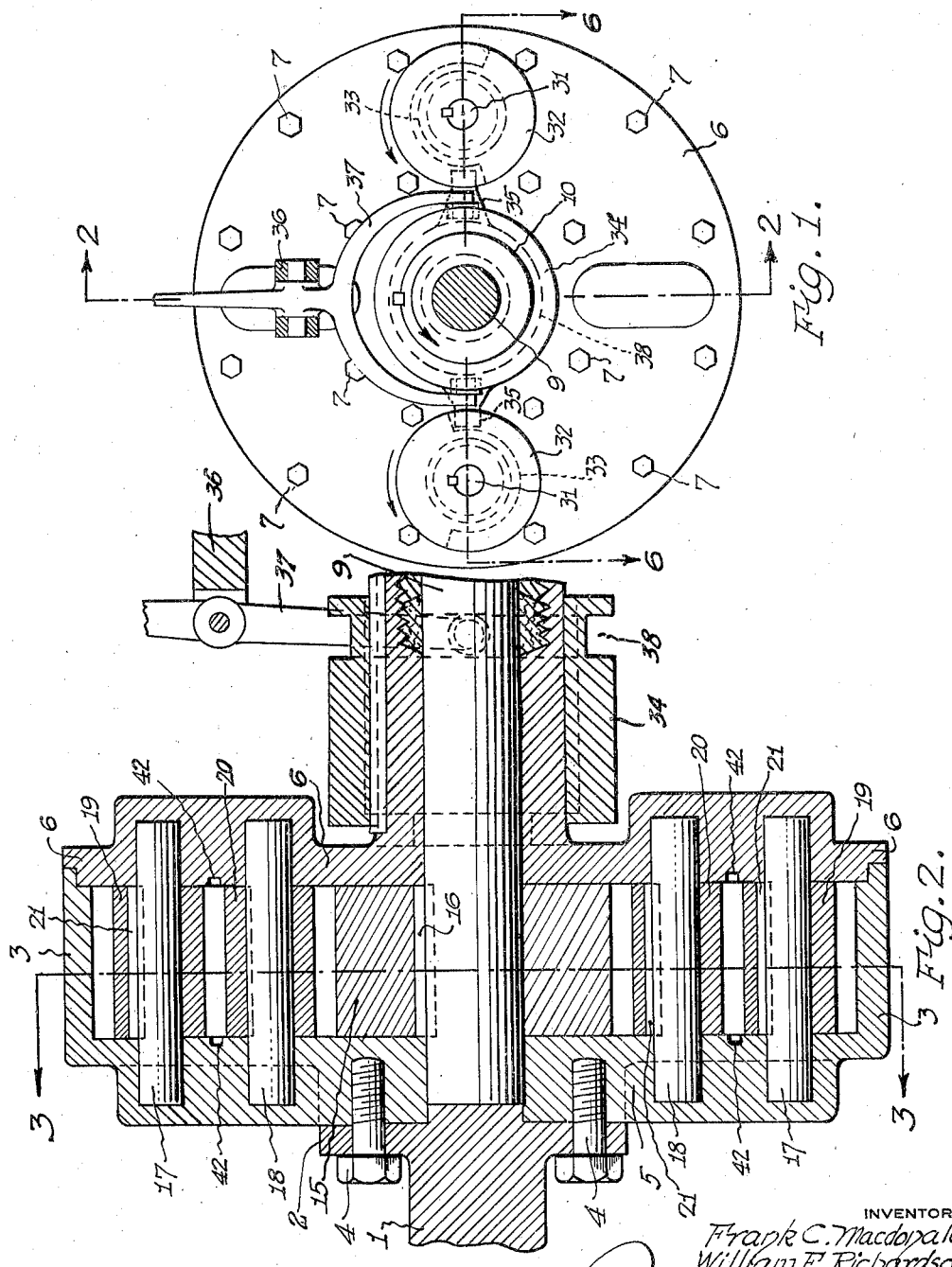
INVENTORS
Frank C. Macdonald,
William E. Richardson,
BY
ATTORNEYS

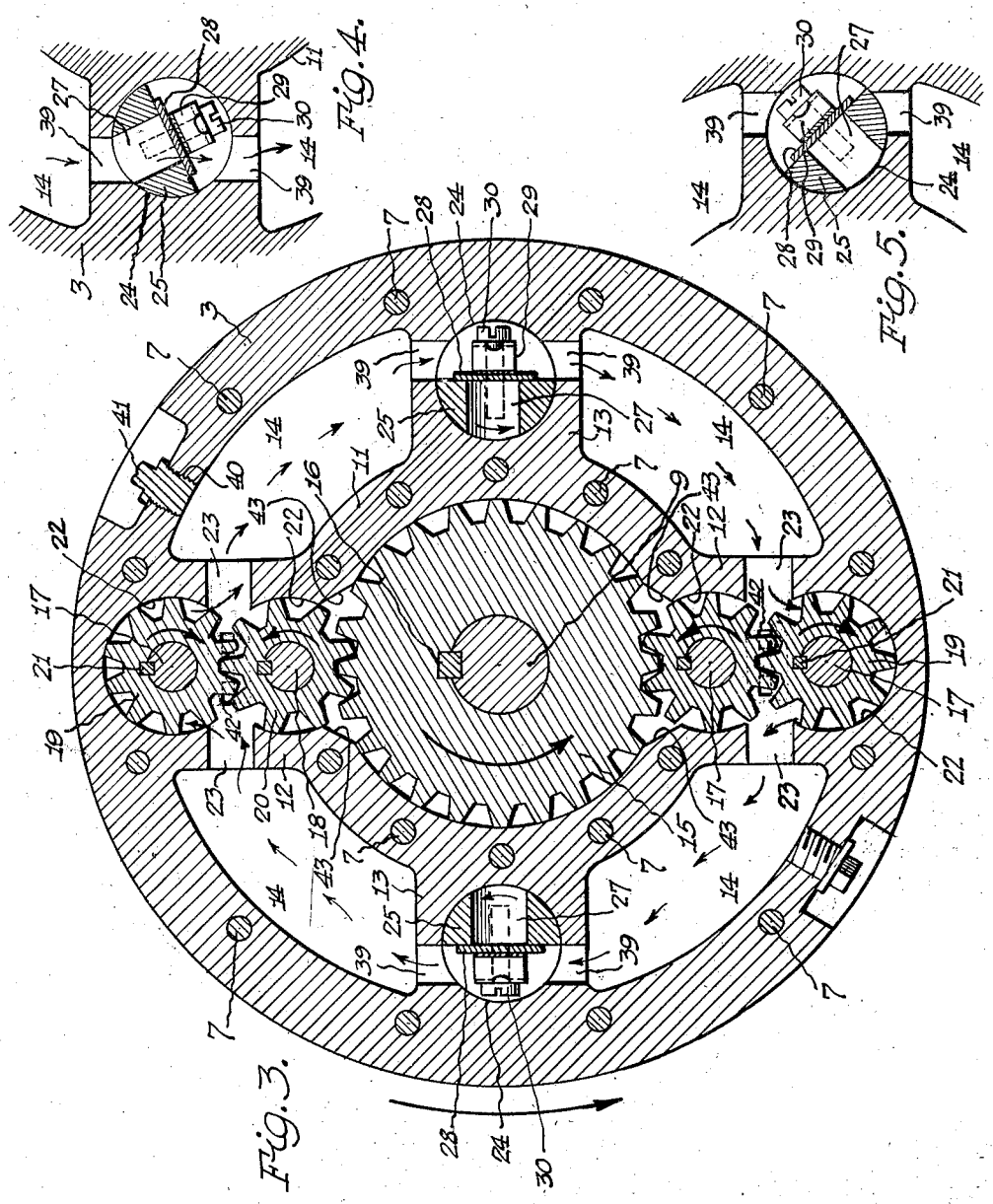

Patented Oct. 30, 1934

1,978,680

UNITED STATES PATENT OFFICE 1,978,680

HYDRAULIC TRANSMISSION

Frank C. Macdonald and William E. Richardson, Detroit, Mich.

Application December 18, 1931, Serial No. 581,929

8 Claims. (Cl. 192—61)

The present invention pertains to a novel hydraulic transmission useful in all cases where power is to be transmitted at various speed reductions from a driving shaft to a driven shaft. A device of this character is particularly useful in automotive vehicles.

The principal object of the invention is to provide a transmission capable of an unlimited number of speed ratios and constructed in a simpler manner than the conventional three-speed transmission. In accordance with this object, the coupling between the driving and the driven shafts involves gearing which, when in mesh, circulates fluid around an enclosing casing. The speed ratio is dependent on the resistance to circulation, and by means of valve controlled orifices, the resistance may be varied from zero to complete obstruction. Zero resistance allows free running of the drive shaft without transmission of power to the driven shaft, and total obstruction results in direct drive from one shaft to the other.

Another object of the invention is to enable free wheeling of the driven shaft, that is, to enable the driven shaft to overrun the drive shaft without also driving and being retarded by the engine. The construction of the device is such that the direction of circulation is reversed when the driven shaft overruns the drive shaft. This phenomenon is utilized for enabling the free wheeling action.

The valves governing the resistance to circulation are so constructed as to obstruct circulation completely while the driven shaft is being driven at high speed, and by a check valve arrangement, to permit circulation in the reverse direction as the driven shaft overruns, without the necessity of an intervening adjustment of the valves.

The invention is fully disclosed by way of example in the following description and the accompanying drawings, in which Fig. 1 is an end view of the device;

Fig. 2 is a section on the line 2—2 of Fig. 1;

Fig. 3 is a section on the line 3—3 of Fig. 1;

Figs. 4 and 5 are details of Fig. 3, showing the different positions of the valves;

Reference to these views will now be made by the use of like characters which are employed to designate corresponding parts throughout.

Figure 6:
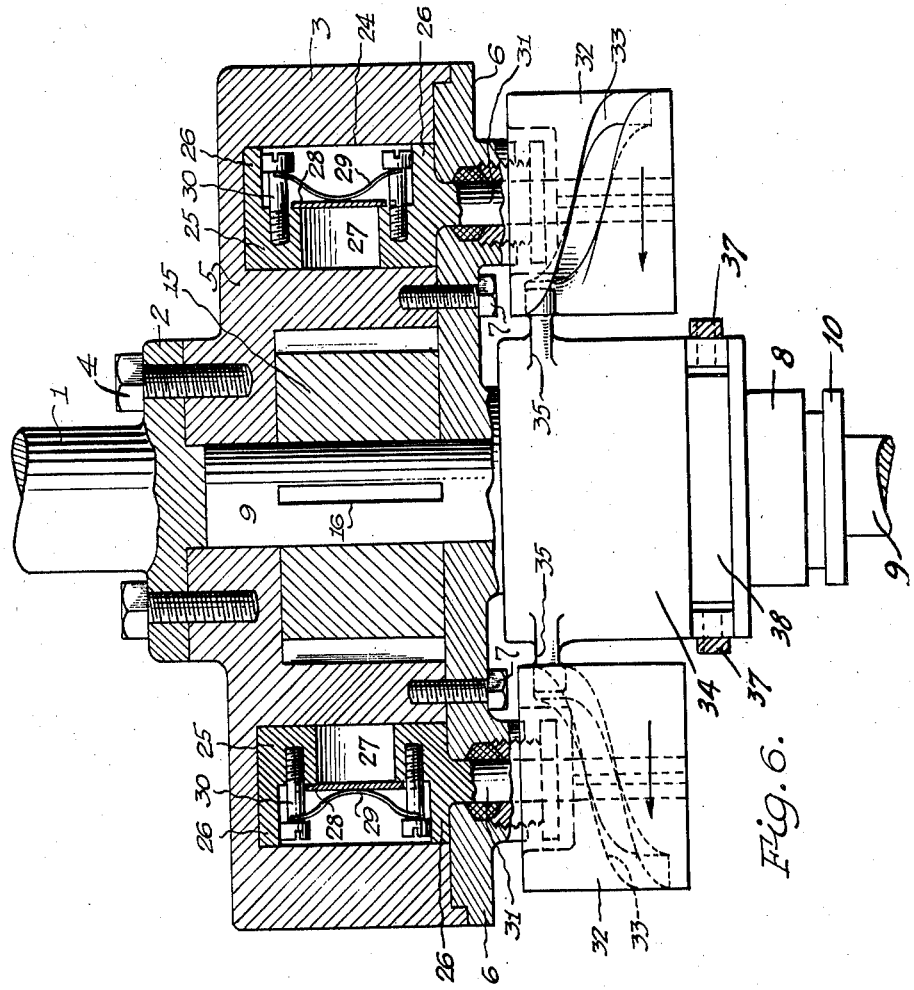
Fig. 6 is a section, partly in elevation, on the line 6—6 of Fig. 1.

The numeral 1 designates a drive or power shaft formed at the end with a flange 2 to which is secured a cylindrical casing 3 by any suitable means, such as bolts 4. The attached end of the casing is closed by an integral back 5, and the other end is closed by a separable cover plate 6 which is held by bolts 7. It will be understood, however, that the parts within the casing are assembled prior to the application of the plate 6, as will presently appear.

The plate 6 is formed with an outwardly extending bearing or boss 8 which is co-axial with the shaft 1. In this bearing is received a driven shaft 9 extending also through the center of the casing 3. This shaft is obviously separate from the shaft 1, as shown more fully in Figs. 2 and 6. A suitable packing gland 10 is fitted into the open end of the bearing 8 and around the shaft 9 for the usual purpose.

Within the casing 3 is formed a concentric hollow cylinder 11 maintained as an integral part of the casing by means of connecting partitions 12 and 13. The partitions 12 are provided in pairs, the members of each pair being comparatively close together and in parallel relation. One or more of such pairs may be provided, and in the present instance two such pairs are formed preferably symmetrical with the same diameter. The partitions 12 and 13 cooperate with the casing 3 and its inner cylinder 11 in forming chambers 14 for a purpose which will presently appear.

The shaft 9 carries a gear 15 which is rotatably mounted within the cylinder 11. This gear is secured to the shaft by a key 16. Between the partitions 12 of each pair is mounted a gear pump embodying parallel stub shafts 17 and 18 journaled in the ends 5 and 6 of the casing and carrying intermeshing pinions 19 and 20 respectively, as shown more clearly in Figs. 2 and 3. The pinions are secured to the shafts by keys 21. The inner walls of the partitions 12 are concaved as at 22 for engagement with the teeth of the pinions so that the latter may carry a fluid in their interdental spaces. The partitions 12 are formed with aligned ports 23 at the line of mesh of the pinions 19 and 20. The inner pinion 20 of each gear pump meshes with the central gear 15.

The partitions 13 are also preferably in diametrical alignment and may be regarded as being considerably thicker than the partitions 12 and formed each with a bore 24 parallel to the axis of the shaft 9. Within each bore is rotatably mounted a valve consisting of a semi-cylindrical member 25 having end flanges 26 to provide bearing in the bore. A radial port 27 is drilled through the member 25 to enable a check valve action which will presently be described. A plate 28 is laid against the flat side or diameter of the valve in a manner to cover the port 27 and is yieldably held in this position by a bowed spring 29 which has its ends retained by studs 30 screwed into the valve body, as clearly shown in Fig. 6. From each valve is extended a journal 31 through the back plate 6 for operating purposes.

On each axle is secured a pulley 32 having a cam groove 33 extending continuously for 180° in the same direction. On the bearing 8 is splined a sleeve 34 having a pair of fingers 35 which extend respectively into the grooves. A suitable fixed bearing 36 is provided for the pivotal mounting of a conventional shifter fork 37 which has its ends extended into a peripheral groove 38 cut in the sleeve 34. The fork may be linked to any convenient operating point, and by sliding the sleeve thereby, the pulleys 32 and valves 25 may be turned through any angle up to 180°.

The valves 25, being substantially of semi-cylindrical formation, fill only one-half of their respective cavities 24. Each partition 13 is formed with ports 39 adapted to establish fluid communication between the valve chambers 24 and the chambers 14 at opposite sides thereof.

In the use of the device, the chambers 14 are filled with a suitable fluid, such as lubricant, through the filling openings 40 in the outer wall of the casing 3. In order to permit filling of all the chambers 14 the valves 25 are set to the position shown in Fig. 3, wherein they permit free communication between the chambers 14. After the device is packed with lubricant the opening 40 is closed by screw plugs 41.

In the operation of the device, the shafts 1 and 9 may be assumed to be the power shaft and driven shaft respectively of a motor vehicle or other machine. In starting, the valves 25 are set to the open position shown in Fig. 3, permitting the casing 3 with its pinions 19 and 20 to ride freely about the central gear 15. In this case, no motion is transmitted to the gear 15 and driven shaft 9.

The other extreme adjustment of the device is that wherein the ports 39 are completely obstructed by the valves 25, as shown in Fig. 5, and this adjustment is obviously made by turning the journals through an angle of about 45°. The counterclockwise rotation of the casing 3, as illustrated by the external arrow in Fig. 3, causes the gear pumps to transfer the fluid in the clockwise direction, as indicated by the small internal arrows. Inasmuch as communication between the chambers 14 is completely obstructed, the gear pumps must cease to operate after the chambers 14 at the respective discharge sides thereof have become filled. Then each pump acts as a key between the casing 3 and the gear 15 so that there is a direct drive from the casing to the shaft 9.

Intermediate speed ratios between the casing and shaft 9, consisting of a combination of the pump operation and planetary movement about the gear 15, are accomplished by adjustments of the valves 25 for partial obstruction of the ports 39. The speed ratio is determined by the extent of the opening or closing of the ports. In all cases where the gear 15 is driven and the gear pumps operate, the inner pinions 20 travel counterclockwise and the outer pinions 19 clockwise, as indicated by the arrows thereon in Fig. 3. This is due to the riding of the pinions 20 over the gear 15 in driving the latter.

When the driven shaft 9 acquires sufficient momentum to drive the power shaft 1 of the engine, the gear 15 reverses the direction of the gear pump, or, in other words, drives the inner pinions 20 clockwise. Consequently the direction of the fluid circulation is also reversed. If this reversed circulation is allowed to proceed unobstructed, the overriding of the driven shaft is not braked by the engine and a free wheeling action is thus made possible.

To utilize this free wheeling action, the valves 25 are turned to the obstructing position shown in Fig. 4, rather than that of Fig. 5, it being understood that complete obstruction of the ports 39 represents the direct drive or high speed wherein an overrunning of the driven shaft is more likely to occur. The valve shown in Fig. 4 is that at the left hand side of Fig. 3 and is adjusted to obstruct clockwise circulation of the fluid. When, however, the driven shaft overrides the drive shaft and causes a reversed or counterclockwise circulation of the fluid, as indicated by the arrows in Fig. 4, the spring-held check valve or plate 28 is free to open, thereby permitting the free circulation in counterclockwise direction which is necessary for the free wheeling action, as already described.

In order to avoid binding of the gear pumps by the trapping of the fluid in the meshing areas of the pinions 19 and 20, the end walls 5 and 6 of the casing are relieved in this area to connect with the ports 23, as indicated by the numeral 42 in Fig. 2. In order to prevent similar binding between the gear and pinions 20, the inner wall of the cylinder 11 is relieved at 43 at opposite sides of each pinion, thereby exposing at least two additional interdental faces of the gear 15 to the area of mesh, so that the fluid displaced by the meshing teeth may be received in these free faces.

Although specific embodiments of the invention have been illustrated and described, it will be apparent that various alterations in the detail of construction may be made without departing from the scope of the invention as indicated by the appended claims.

What we claim is:—

1. A hydraulic transmission comprising a casing, means for driving the same, a driven shaft extending into said casing, a gear secured on said shaft and disposed within said casing, a pinion carried rotatably by said casing and meshing with said gear, a partition dividing the interior of said casing radially and having a port therethrough, a valve adjustable bodily in each partition and having a passage therethrough adapted to permit flow through the port, and a check valve member carried by said valve and effective on said passage, said member being adapted to be opened by flow in only one direction relatively thereto, so that the functioning of said member is dependent on the position of said valve.

2. A hydraulic transmission comprising a casing, means for driving the same, a driven shaft extending into said casing, a gear secured on said shaft and disposed within said casing, a pinion carried rotatably by said casing and meshing with said gear, a partition dividing the interior of said casing radially and having a port therethrough, a semi-cylindrical valve member rotatably mounted in said partition and adapted to cover and uncover said port, said member having a port therethrough adapted to register with the first named port, and a one-way check valve over said second named port.

3. A hydraulic transmission comprising a casing, means for driving the same, a driven shaft extending into said casing, a gear secured on said shaft and disposed within said casing, a pinion carried rotatably by said casing and meshing with said gear, a partition dividing the interior of said casing radially and having a port therethrough, a semi-cylindrical valve member rotatably mounted in said partition and adapted to cover and uncover said port, said member having a port therethrough adapted to register with the first named port, and a plate yieldably mounted over the second named port and adapted to move relatively thereto.

4. A hydraulic transmission comprising a casing, means for driving the same, a driven shaft extending into said casing, a gear secured on said shaft and disposed within said casing, a pair of intermeshing pinions rotatably mounted in said casing, one of said pinions meshing with said gear, a partition dividing the interior of said casing radially and having a port therethrough, a valve adjustable bodily in each partition and having a passage therethrough adapted to permit flow through the port, and a check valve member carried by said valve and effective on said passage, said member being adapted to be opened by flow in only one direction relatively thereto, so that the functioning of said member is dependent on the position of said valve.

5. A hydraulic transmission comprising a casing, means for driving the same, a driven shaft extending into said casing, a gear secured on said shaft and disposed within said casing, a pair of intermeshing pinions rotatably mounted in said casing, one of said pinions meshing with said gear, a partition dividing the interior of said casing radially and having a port therethrough, a semi-cylindrical valve member rotatably mounted in said partition and adapted to cover and uncover said port, said member having a port therethrough adapted to register with the first named port, and a one-way check valve over said second named port.

6. A hydraulic transmission comprising a casing, means for driving the same, a driven shaft extending into said casing, a gear secured on said shaft and disposed within said casing, a pair of pinions rotatably mounted in said casing and meshing with said gear, a partition dividing the interior of said casing radially and having a port therethrough, a semi-cylindrical valve member rotatably mounted in said partition and adapted to cover and uncover said port, said member having a port therethrough adapted to register with the first named port, and a plate yieldably mounted over the second named port and adapted to move relatively thereto.

7. A hydraulic transmission comprising a casing, means for driving the same, a driven shaft extending into said casing, a gear secured on said shaft and disposed within said casing, pinions carried rotatably by said casing and meshing with said gear, a pair of partitions dividing the interior of said casing radially between said pinions and having ports therethrough, a valve in each partition adapted to cover and uncover the corresponding port, each valve embodying a check valve adapted to obstruct flow through the corresponding port in one direction and permit flow therethrough in the other direction, and means for actuating said valves in unison.

8. A hydraulic transmission comprising a casing, means for driving the same, a driven shaft extending into said casing, a gear secured on said shaft and disposed within said casing, two pairs of pinions rotatably carried by said casing, the pinions of each pair meshing with each other and one pinion of each pair meshing with each gear, a pair of partitions dividing the interior of said casing radially between said pairs of pinions and having ports therethrough, a check valve in each partition adapted to obstruct flow through the corresponding port in one direction and permit flow therethrough in the other direction, and means for actuating said valves in unison.

FRANK C. MACDONALD.
WILLIAM E. RICHARDSON.